US012032809B2

(12) United States Patent
Wong

(10) Patent No.: US 12,032,809 B2
(45) Date of Patent: Jul. 9, 2024

(54) COMPUTER SYSTEM AND METHOD FOR CREATING, ASSIGNING, AND INTERACTING WITH ACTION ITEMS RELATED TO A COLLABORATIVE TASK

(71) Applicant: Procore Technologies, Inc., Carpinteria, CA (US)

(72) Inventor: Jennifer Yianhong Wong, Ventura, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 195 days.

(21) Appl. No.: 16/226,193

(22) Filed: Dec. 19, 2018

(65) Prior Publication Data
US 2020/0201496 A1   Jun. 25, 2020

(51) Int. Cl.
*G06F 3/0484*   (2022.01)
*G06F 3/0482*   (2013.01)
*G06F 40/18*   (2020.01)
*H04L 67/10*   (2022.01)

(52) U.S. Cl.
CPC .......... *G06F 3/0484* (2013.01); *G06F 3/0482* (2013.01); *H04L 67/10* (2013.01); *G06F 40/18* (2020.01)

(58) Field of Classification Search
CPC ....... H04L 67/10; G06F 40/18; G06F 3/0482; G06F 3/0484; G06Q 10/103; G06Q 10/101
See application file for complete search history.

(56) References Cited

U.S. PATENT DOCUMENTS 8,719,217 B1* 5/2014 Vivalda ................. G06F 16/283
707/607
2007/0282660 A1* 12/2007 Forth ...................... G06Q 10/10
705/7.15

(Continued)

OTHER PUBLICATIONS

LearnChemE. (Sep. 18, 2012). Entering an Equation into Excel. YouTube. https://www.youtube.com/watch?v=-kNiQGgTYK4. (Year: 2012).*

(Continued)

*Primary Examiner* — Daniel Samwel
*Assistant Examiner* — David Tan
(74) *Attorney, Agent, or Firm* — Lee Sullivan Shea & Smith LLP

(57) ABSTRACT

A computing system may receive, via a first front-end software module running on a first client station associated with a first user, a request to assign an action item to a second user. The action item may comprise an embedded link to a second front-end software module that can be used to complete the action item. The computing system may then cause a second client station associated with the second user to present the action item to the second user, receive an indication that the second user has selected the embedded link of the action item, responsively cause the second client station to begin running the second front-end software module, and receive input from the second user that facilitates completion of the action item. In turn, the computing system may cause the first and/or the second client station to present an indication that the action item has been completed.

20 Claims, 10 Drawing Sheets

(56) References Cited

U.S. PATENT DOCUMENTS

| | | | |
|---|---|---|---|
| 2008/0209417 A1* | 8/2008 | Jakobson | G06F 9/4856 |
| | | | 718/100 |
| 2018/0129993 A1* | 5/2018 | Fowler | G06Q 10/109 |
| 2018/0365263 A1* | 12/2018 | Mohan | H04L 65/4053 |
| 2019/0138587 A1* | 5/2019 | Silk | G06F 40/197 |

OTHER PUBLICATIONS

Rasmussen, K. (Jul. 17, 2013). Introducing Hypertext: "@" Links for Projects, Tasks, People, and Tags. The Asana Blog. https://blog.asana.com/2012/08/introducing-hypertext-from-asana/ (Year: 2013).*

Google. "Overview of comments and discussions." support.google.com/docs/answer/65129, Feb. 1, 2015 (accessed via Wayback Machine at web.archive.org/web/20150201171759/support.google.com/docs/answer/65129, 3 pages.

Slack. "Built-in slash commands." get.slack.help/hc/en-us/articles/201259356-Built-in-slash-commands, Dec. 1, 2018 (accessed via Wayback Machine at web.archive.org/web/20181201144649/https://get.slack.help/hc/en-us/articles/201259356-Built-in-slash-commands, 4 pages.

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

CAUSE A CLIENT STATION TO PRESENT A FIRST FRONT-END SOFTWARE MODULE THAT INCLUDES AN INDICATION OF ONE OR MORE ACTION ITEMS
502

RECEIVE INPUT INDICATING A SELECTION OF AN ACTION ITEM FROM THE FIRST FRONT-END SOFTWARE MODULE
504

CAUSE THE CLIENT STATION TO PRESENT A MODIFIED VIEW OF THE FIRST FRONT-END SOFTWARE MODULE THAT PRESENTS THE SELECTED ACTION ITEM
506

RECEIVE INPUT INDICATING A SELECTION OF AN ACTION-EMBEDDED LINK INCLUDED IN THE ACTION TIEM
508

BASED ON THE RECEIVED INPUT INDICATING THE SELECTION OF THE ACTION-EMBEDDED LINK, CAUSE THE CLIENT STATION TO PRESENT A SECOND FRONT-END SOFTWARE MODULE THAT FACILITATES COMPLETION OF THE ACTION ITEM
510

RECEIVE DATA INDICATING THAT THE ACTION ITEM HAS BEEN COMPLETED
512

CAUSE THE CLIENT STATION TO PRESENT AN INDICATION THAT THE ACTION ITEM HAS BEEN COMPLETED
514

| Description | Original Budget Amount | Budget Modifications | Approved COs | Projected Budget Changes | Projected Budget | Committed Costs | Direct Costs |
|---|---|---|---|---|---|---|---|
| ▼ Building A | | | | | | | |
| ▼ 01 - General Conditions | | | | | | | |
| 01-010 - Project Manager: Labor | $100,000.00 | $400.00 | $500.00 | $30,000.00 | $110,000.00 | $0.00 | $0.00 |
| 01-011 - Project Engineer: Labor | $70,000.00 | $700.00 | $10,000.00 | $20,000.00 | $60,000.00 | $0.00 | $0.00 |
| 01-012 - Superintendent: Labor | $12,000.00 | $300.00 | $200.00 | $7,000.00 | $30,000.00 | $0.00 | $0.00 |
| 01-013 - Project Coordinator: Labor | $60,000.00 | $800.00 | $600.00 | $20,000.00 | $60,000.00 | $0.00 | $0.00 |
| 01-300 - Temporary Facilities and C... | $70,000.00 | $300.00 | $900.00 | $80,000.00 | $55,000.00 | $10,000.00 | $30,000.00 |
| 01-300 - Temporary Facilities and C... | $70,000.00 | $500.00 | $100.00 | $40,000.00 | $60,000.00 | $15,000.00 | $20,000.00 |
| 01-500 - Temporary Utilities: Other | $30,000.00 | $100.00 | $200.00 | $30,000.00 | $25,000.00 | $20,000.00 | $40,000.00 |
| 01-500 - Temporary Electricity: Other | $15,000.00 | $400.00 | $250.00 | $2,999.00 | $20,000.00 | $5,000.00 | $35,000.00 |
| 01-501 - Temporary Lighting: Other | $60,000.00 | $600.00 | $800.00 | $1,000.00 | $67,000.00 | $8,000.00 | $25,000.00 |
| 01-501 - Temporary Water: Other | $20,000.00 | $1,000.00 | $700.00 | $30,000.00 | $30,000.00 | $1,000.00 | $3,000.00 |
| 01-600 - Sanitary Facilities: Other | $30,000.00 | $2,000.00 | $1,000.00 | $40,000.00 | $42,000.00 | $12,000.00 | $10,000.00 |

FIG. 8

COMPUTER SYSTEM AND METHOD FOR CREATING, ASSIGNING, AND INTERACTING WITH ACTION ITEMS RELATED TO A COLLABORATIVE TASK

BACKGROUND

Collaborative projects are often complex endeavors involving the completion of a series of tasks that involve the coordination of many different individuals.

For example, a construction-related project may involve several different phases, where each phase may involve a series of tasks that require significant collaboration between different individuals to complete various actions items for a given task. For instance, a logistics phase of a construction-related project may involve tasks to allocate various resources to the project, including planning a budget for the project.

In particular, one specific task that may involve significant collaboration between different users involved in the logistics phase of the project is budget reconciliation. Indeed, when reconciling a budget to ensure that values are accurate and communicated transparently, a number of different individuals typically need to collaborate with one another, including a project executive, a senior and/or assistant project manager, and/or project engineer, among others. Further, in practice, these collaborations are typically carried out over the course of several emails, telephone calls, meetings, or the like, which often do not include sufficient specificity as to the information needed to complete the outstanding action items for budget reconciliation and/or the steps that can or should be taken to complete such action items. As a result, a complex collaborative task such as budget reconciliation often involves significant time delays and/or errors.

Likewise, individuals or a team of individuals involved in collaborative tasks for various other projects (e.g., business-related projects, school-related projects, etc.) typically experience similar inefficiencies described above. Thus, any tool that can improve the execution and completion of various actions items for a given collaborative task is desired.

Overview

In order to assist with the execution and completion of various actions items for a given collaborative task, some have developed software applications that allow users to collaborate with one another on certain types of tasks via a communication network such as the Internet, where such software applications typically comprise front-end software running on the users' client stations and back-end software running on one or more servers that are accessible to the client stations via the communication network. For example, software applications currently exist that allows users to collaborate with one another on the preparation of a document. As another example, software applications currently exist that allow a first user to create and assign a particular action item to a second user and then allow the second user to receive, review, and provide status updates on the assigned action item. One such software application is the "Punch List" tool offered by Procore Technologies, Inc. Software applications for collaborating on other types of tasks may exist as well.

However, while software applications currently exist for collaborating on certain types of tasks, these collaborative software applications still have several limitations. For instance, while some collaborative software applications exist that allow for creation, assignment, and/or management of action items, these software applications fail to provide any guidance as to what particular information should be referenced while carrying out the action item and/or what specific software tools can or should be used to assist in completing the action item. As a result, the completion of an action item that is created and assigned using existing software applications is often delayed while the assignee navigates through one or more software applications to locate the necessary information and/or the appropriate software tool(s) for completing the action item.

To address these and other problems with existing collaborative software applications, disclosed herein is an improved collaborative software application for creating, assigning, and interacting with an action item. An action item created via the disclosed software application may include a particular action for one or more assignees that may include an action-embedded link to a front-end software module that facilitates completion of the action item. In general, an action embedded-link may take the form of a hyperlink, and selection of an action-embedded link by a user may result in the user's client station accessing and beginning to run a front-end software module and may further cause data related to the action item to be pre-populated within the front-end module to facilitate completion of the action item.

Utilizing such an action-embedded link, the disclosed software application provides a significant advantage over existing collaborative software applications as it provides an assignee reviewing the action item with information as to what particular information should be referenced while carrying out the action item and/or what specific software modules can or should be used to assist in completing the action item. Further, because the selection of a given action-embedded link may result in data related to the action item to be pre-populated within a front-end module that facilitates completion of the action item, the disclosed software application may prevent significant time delays and/or errors resulting from users providing inaccurate information while completing an action item.

In one aspect of the disclosed software application, an assignor may access the disclosed software application to create an action item for one or more assignees involved in a collaborative task. The process for creating an action item may take various forms and may be carried out in various manners.

The example workflow for creating an action item related to a collaborative task may begin with an assignor requesting access to a first front-end module of the disclosed software application via the assignor's client station. In response to receiving the assignor's request, a back-end platform may then cause the assignor's client station to present the first front-end module of the disclosed software application.

In practice, while accessing the first front-end software module, the assignor may input an indication that the assignor wishes to create a new action item in connection with some aspect of the information presented via the first front-end software module. The back-end platform may then receive the indication that the assignor wishes to create the new action item in connection with some aspect of the information presented via first front-end software module, which may in turn trigger the back-end platform to take one or more actions based on the assignor's input.

In particular, the back-end platform may cause the assignor's client station to present a modified view of the first front-end software module that enables the assignor to input data defining the new action item to be created. In general, the modified view of the first front-end module may include one or more elements (e.g., windows, indicators, etc.) that may be different than the elements that were presented in the view that was initially accessed by the assignor (e.g., view 400).

While accessing the modified view of the given front-end module, the assignor may input data that defines the action item to be created. As some examples, the assignor may input data that identifies one or more assignees, a description of the particular action that needs to be taken by the one or more assignees that may include plain text and/or at least one action-embedded links to a second front-end software module that facilitates completion of the action item, and a an indication that the assignor has finished entering the data defining the action item, among other examples.

In addition to the user input defining the action item to be created, the assignor's client station and/or the back-end platform may also contribute to the data that defines the action item. For example, the back-end platform may cause the assignor's client station to present data that identifies the assignor creating the action item, the creation date of the action item, and/or a status indicator for the action item to be created that may later enable the assignor to approve the action item upon completion, among other examples.

The back-end platform may then receive the data that defines the action item, which may in turn trigger the back-end platform to take one or more actions based on the received information. As one example, the back-end platform may store the information that defines the action item and/or a portion of the first front-end software module that is related to the action item. As another example, the back-end platform may generate an alert to notify a given assignee that has designated by the assignor to complete the action item.

After the action item has been created, the disclosed software application may provide an assignee of the action item with a workflow for reviewing and potentially taking steps to complete the action item. The example workflow for reviewing and taking steps to complete an action item may begin with an assignee requesting access to a first front-end software module of the disclosed software application that includes an indication of one or more actions items assigned to the assignee via the assignee's client station. In practice, the assignee may request access to the first front-end module to check if the assignee has been assigned an action item and potentially complete the action item.

In response to receiving the assignee's request, the back-end platform may cause the assignee's client station to present the first front-end software module of the disclosed software application that includes the indication of the one or more action items. The first front-end module that may be presented to the assignee's client station may take various forms.

In practice, while accessing the first front-end module that indicates one or more action items assigned to the assignee, the assignee may input a request to view an action item in more detail. The back-end platform may then receive the assignee's input indicating a selection of the action item from the first front-end module, which may in turn trigger the back-end platform to take one or more actions based on the assignee's input.

In particular, the back-end platform may cause the assignee's client station to present a modified view of the first front-end module that presents the selected action item to the assignee. While accessing the modified view of the given front-end module, the assignee may take various steps to complete the action item.

As one possibility, the assignee may select a given action-embedded link that is included in the action item, which may be presented in the modified view. The back-end platform may then receive input indicating the selection of the action-embedded link included in the action item, which may in turn trigger the back-end platform to take one or more actions.

In particular, in response to the received input indicating the selection of the action-embedded link, the back-end platform may cause the assignee's client station to present a second front-end software module of the disclosed software application identified by the selected action-embedded link that facilitates completion of the action item and also potentially cause data related to the action item to be pre-populated within the second front-end software module. Depending on the action-embedded link selected by assignee, the second front-end module may take various forms.

The back-end platform may then receive data indicating that the action item has been completed. For instance, the assignee's client station may send an indication that the action item has been completed to the back-end platform, which may in turn trigger back-end platform to update data defining the action item to indicate that the action item has been completed.

In turn, the back-end platform may cause one or both of the assignor's client station or the assignee's client station to present an indication that the action item has been completed.

Accordingly, in one aspect, disclosed herein is a method that involves (1) receiving, via a first front-end software module running on a first client station associated with a first user, a request to assign an action item to a second user, wherein the action item comprises an embedded link to a second front-end software module that can be used to complete the action item, (2) after receiving the request to assign the action item to the second user, causing a second client station associated with the second user to present the action item to the second user, (3) receiving, via the second client station, an indication that the second user has selected the embedded link of the action item, (4) in response to receiving the indication that the second user has selected the embedded link of the action item, causing the second client station to begin running the second front-end software module, (5) receiving, via the second front-end software module running on the second client station, input from the second user that facilitates completion of the action item, (6) after receiving the input from the second user, determining that the action item has been completed, and (7) causing one or both of the first client station or the second client station to present an indication that the action item has been completed.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable storage medium provisioned with software that is executable to cause a computing system to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 4B depicts an example modified view of a front-end module that may be presented to a client station.

FIG. 5 depicts an example flow chart for completing an action item related to a given task.

FIG. 6 depicts another example view of a front-end module that may be presented to a client station.

FIG. 8 depicts an example updated view of a front-end module that may be presented to a client station.

DETAILED DESCRIPTION

Figure 1:
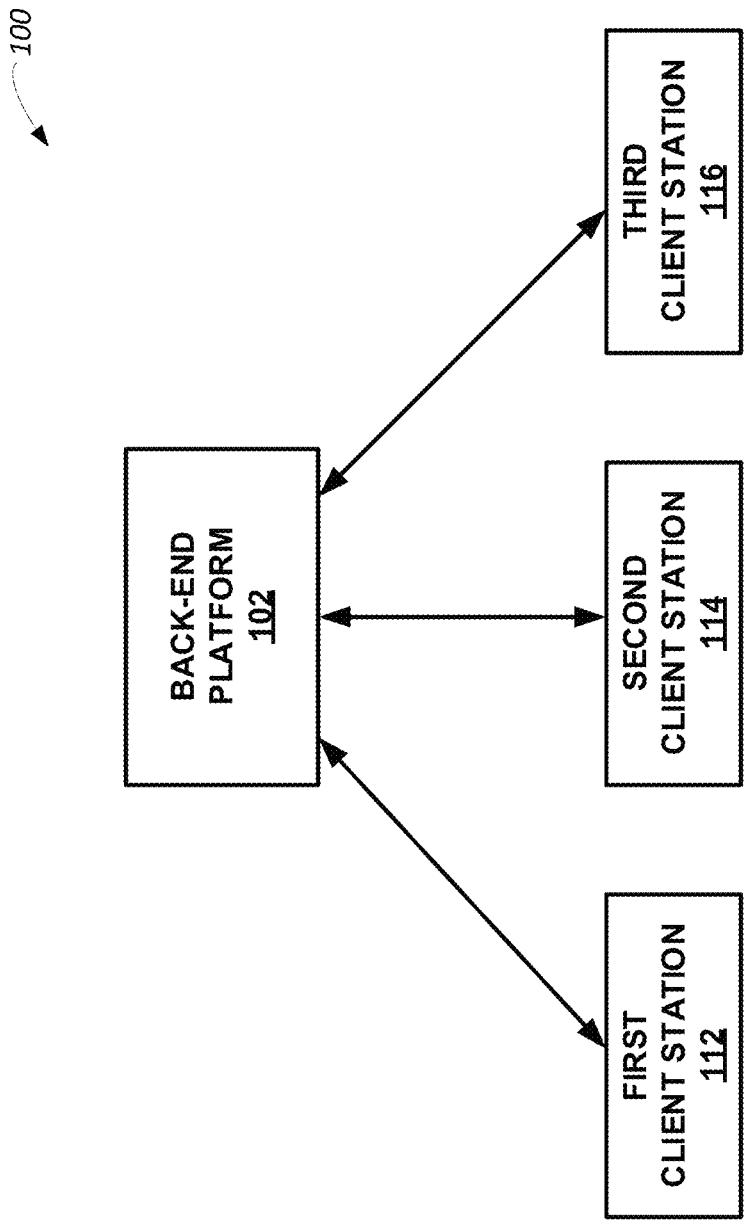
FIG. 1 depicts an example network configuration in which example embodiments may be implemented.

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE SYSTEM CONFIGURATION

The present disclosure is generally directed to a collaborative software application that enables different users to collaborate with one another on any of various different action items, examples of which include identifying and/or resolving potential issues related to a given task (e.g., budget reconciliation task, design task, etc.), creating and/or revising one or more data entries related to a given task, and/or providing instructions to a given user, among other examples.

At a high level, this collaborative software application may comprise front-end software running on client stations of individuals interested in collaborating on a task and back-end software running on a back-end platform (sometimes referred to as a "cloud" platform) that interacts with and/or drives the front-end software, which may be operated (either directly or indirectly) by the provider of the software. In this respect, the front-end software may take the form of a native application, a web application, and/or a hybrid application, among other possibilities. However, the software technology disclosed herein may take other forms as well.

While running on a user's client station, the front-end of the disclosed software application may provide a user interface through which the user may interact with the software application via visual elements, control elements, or the like. Further, the front-end of the disclosed software application may be comprised of one or more discrete software modules, where each respective software module defines a respective "view" (or "page") of the user interface through which the user may interact with the software application.

In practice, a given view of the user interface provided by the front-end of the disclosed software application may include one or more "windows," which may display information and/or present control elements within a certain area of the view. A window can take various forms, and in particular, a window can be manipulated by a user to take various forms. For instance, a user may manipulate a window by hiding (i.e., minimizing or closing) the window, adjusting the window to a different size, and/or moving the window to a different area within a view (e.g., place it next to another window, place it in front of or behind another window, etc.). A window can be manipulated to take various other forms as well.

Further, in practice, a given view of the user interface provided by the front-end of the disclosed software application may include a "menu" that allows a user to select an option to execute a given command (e.g., a command to navigate to another software module of the disclosed software application's front-end). Such a menu may take various forms. As one possibility, a menu may take the form of a "menu bar" that is displayed horizontally across the top of a view and/or along the top of one of more windows within a view. As another possibility, a menu may take the form of a "pull-down menu" that includes a list of options to execute a given command. As yet another possibility, the menu may take the form of a menu bar that includes a pull-down menu, among other control elements, such as one or more filters and/or individual icons that can be selected by an individual to execute a given command. The menu may take various other forms as well.

The user interface of the disclosed software application's front-end may take various other forms as well.

Turning now to the figures, FIG. 1 depicts an example network configuration 100 in which example embodiments of the present disclosure may be implemented. As shown in FIG. 1, network configuration 100 includes a back-end platform 102 that may be communicatively coupled to one or more client stations, depicted here, for the sake of discussion, as three client stations 112, 114, and 116.

In general, back-end platform 102 may comprise one or more computing systems that have been provisioned with software for carrying out one or more of the platform functions disclosed herein, including but not limited to receiving data related to an action item for a given task (broadly referred to herein as "task-related data"), storing task-related data for future access by client stations 112, 114, 116, and/or transmitting data and/or instructions that cause one or more client stations 112, 114, 116 to output information related to an action item for a given task. The one or more computing systems of back-end platform 102 may take various forms and be arranged in various manners.

For instance, as one possibility, back-end platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates back-end platform 102 may either supply its own cloud infrastructure or may obtain the cloud infrastructure from a third-party provider of "on demand" computing resources, such include Amazon Web Services (AWS) or the like. As another possibility, back-end platform 102 may comprise one or more dedicated servers that have been provisioned with software for carrying out one or more of the platform functions disclosed herein. Other implementations of back-end platform 102 are possible as well.

In turn, client stations 112, 114, 116 may take any of various forms, examples of which may include a desktop computer, a laptop, a netbook, a tablet, a smartphone, and/or a personal digital assistant (PDA), among other possibilities.

As further depicted in FIG. 1, back-end platform 102 is configured to interact with one or more client stations 112, 114, 116 over respective communication paths. Each communication path between back-end platform 102 and one of client stations 112, 114, 116 may generally comprise one or more communication networks and/or communications links, which may take any of various forms. For instance, each respective communication path with back-end platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end platform 102 may be wireless, wired, or some combination thereof, and may carry data according to any of various different communication protocols. Although not shown, the respective communication paths with back-end platform 102 may also include one or more intermediate systems. For example, it is possible that back-end platform 102 may communicate with a given client station 112, 114, 116 via one or more intermediary systems, such as a host server (not shown). Many other configurations are also possible.

The interaction between client stations 112, 114, 116 and back-end platform 102 may take various forms. As one possibility, client stations 112, 114, 116 may send certain user input to back-end platform 102, which may in turn trigger back-end platform 102 to take one or more actions based on the user input. As another possibility, client stations 112, 114, 116 may send a request to back-end platform 102 to access a particular front-end software module of the disclosed software application, and back-end platform 102 may then cause client stations 112, 114, 116 to present the particular front-end software module of the disclosed software application in response to such a request. The interaction between client stations 112, 114, 116 and back-end platform 102 may take various other forms as well.

In practice, presenting a given front-end software module on client stations 112, 114, 116 may involve back-end platform 102 outputting task-related data and other associated data and/or instructions that define the visual appearance of the given front-end software module through which the task-related data is to be presented on one or more of client stations 112, 114, 116. Such data and/or instructions for defining the visual appearance of a given front-end software module may take various forms, examples of which may include Hypertext Markup Language (HTML), Cascading Style Sheets (CSS), and/or JavaScript, among other possibilities. However, depending on the circumstance, it is also possible that back-end platform 102 may output task-related data to client stations 112, 114, 116 without any associated data and/or instructions for defining the visual appearance of a given front-end software module.

Further, in practice, client stations 112, 114, and 116 may each be operated by and/or otherwise associated with a different individual involved in a collaborative task. For example, client station 112 may be operated by an "assignor" that may be responsible for creating an action item for the collaborative task, client station 114 may be operated by an "assignee" responsible for completing an action item for the collaborative task, and client station 116 may be operated by an individual (e.g., project manager, project coordinator, etc.) responsible for monitoring action items to track the progress of a collaborative task. However, client stations 112, 114, and 116 may be operated by and/or otherwise associated with individuals having various other roles with respect to a collaborative task as well. Further, while FIG. 1 shows an arrangement in which three particular client stations are communicatively coupled to back-end platform 102, it should be understood that an arrangement may include more or fewer client stations.

Although not shown in FIG. 1, back-end platform 102 may also be configured to receive data from one or more external data sources that may help to facilitate collaboration on a given task. A given external data source—and the task-related data output by such data sources—may take various forms.

As one example, a given external data source may comprise a database that stores user account information for the users (e.g., names of the assignors and/or assignees) of the disclosed software application, and back-end platform 102 may be configured to receive data related to a given user account from the given data source. As another example, a given external data source may comprise a database that stores action-embedded links that each correlate to a specific module of the disclosed software application, and back-end platform 102 may be configured to receive data related to a given action-embedded link and cause a client station to present the given action-embedded link. A given external data source may take various other forms as well.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
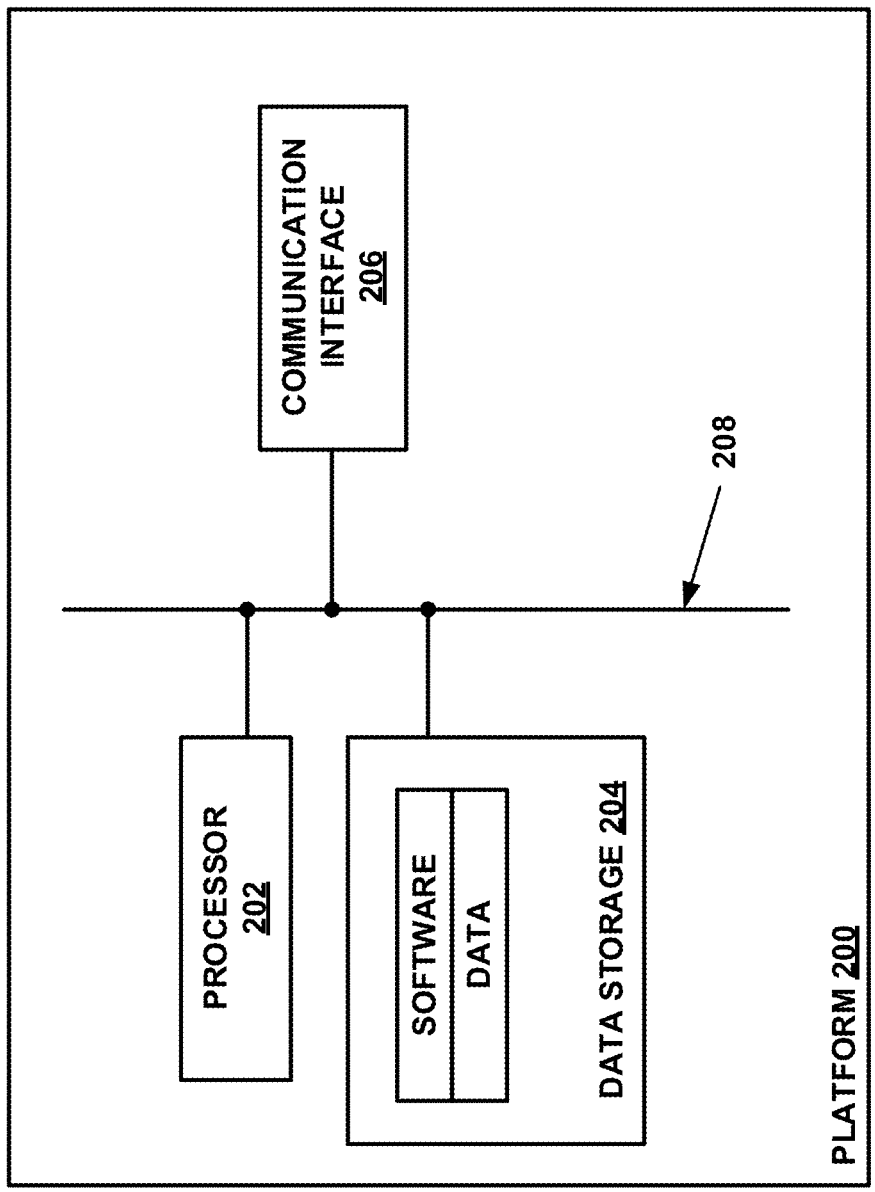
FIG. 2 depicts an example computing platform that may be configured carry out one or more of the functions of the present disclosure.

FIG. 2 is a simplified block diagram illustrating some structural components that may be included in an example computing platform 200, which could serve as back-end platform 102 of FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the platform 200 to carry out the platform-side functions disclosed herein. These software components may generally take the form of program instructions that are executable by the processor 202 to carry out the disclosed functions, which may be arranged together into software applications, virtual machines, software development kits, toolsets, or the like. Further, data storage 204 may be arranged to store task-related data in one or more databases, file systems, or the like. Data storage 204 may take other forms and/or store data in other manners as well.

Communication interface 206 may be configured to facilitate wireless and/or wired communication with external data sources that may help facilitate collaboration on a given task and/or client stations, such as client stations 112, 114, 116 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE OPERATIONS

As described above, the present disclosure is generally directed to an improved collaborative software application for creating, assigning, and interacting with an action item that includes an action-embedded link, which allows the action item to be completed in a more efficient manner.

At a high level, the disclosed software application may allow a first user to input a request to create an action item to a second user, where the first user may be referred to as the "assignor" and the second user may be referred to as the "assignee." One of ordinary skill in the art will appreciate that the assignor may input a request to create an action item to more than one assignee as well.

Broadly speaking, an action item created via the disclosed software application may include a particular action for one or more assignees that may include an action-embedded link to a front-end software module that facilitates completion of the action item. In general, an action embedded-link may take the form of a hyperlink, and selection of an action-embedded link by a user (e.g., assignee) may result in the user's client station accessing and beginning to run a front-end software module and may further cause data related to the action item to be pre-populated within the front-end module to facilitate completion of the action item. In practice, the user's client station may send an indication that the user has selected the action-embedded link to the back-end platform (e.g., back-end platform 102), and the back-end platform may then cause the user's client station to begin running the front-end software module and further cause the user's client station to present pre-populated data that facilitates completion of the action item. An action-embedded link may take various other forms, and the action item created via the disclosed software application may include various other information as well.

In one aspect of the disclosed software application, an assignor may access the disclosed software application to create an action item for one or more assignees involved in a collaborative task. The process for creating an action item may take various forms and may be carried out in various manners. Some example functions for creating an action item will now be described with reference to FIG. 3.

Figure 3:
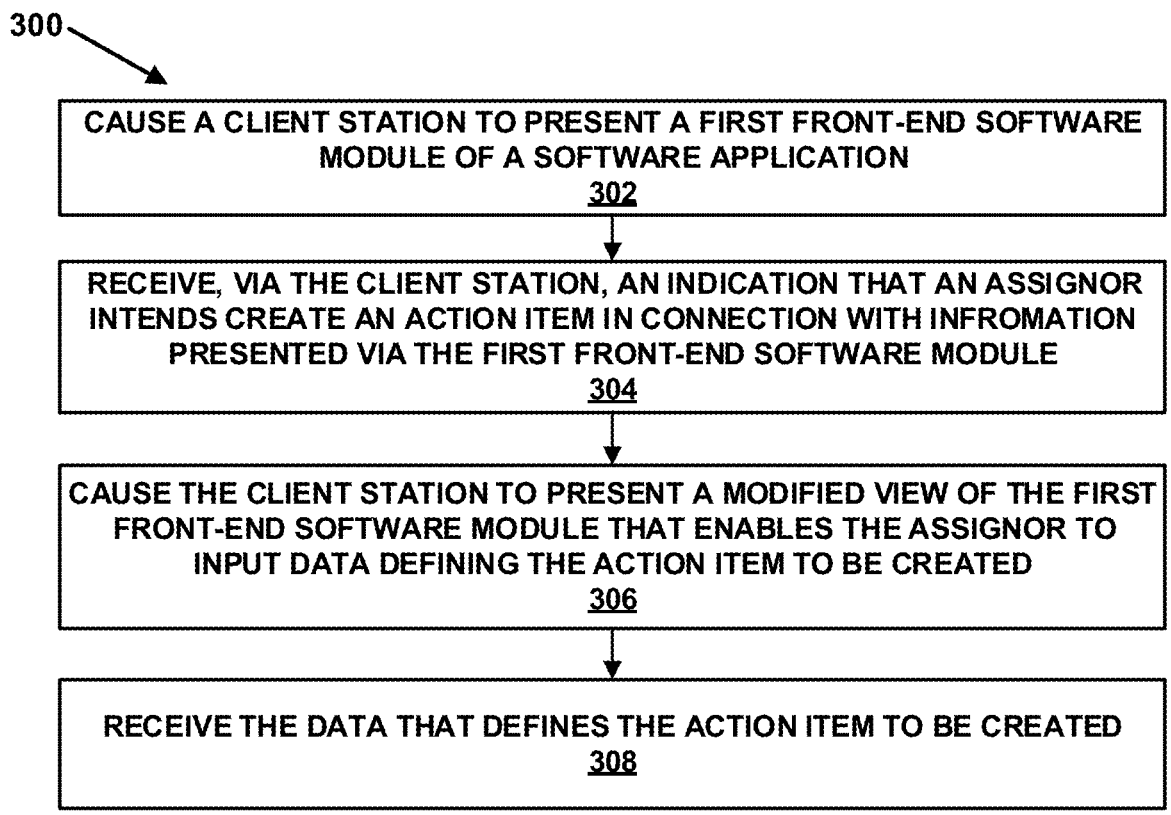
FIG. 3 depicts an example flow chart for creating an action item related to a given task.

For the purposes of illustration only, the example functions are described as being carried out by a back-end platform (e.g., back-end platform 102). However, it is possible that the responsibility for carrying out the functions of the disclosed process could be distributed between a back-end platform (e.g., back-end platform 102) and one or more client stations (e.g., client stations 112, 114, and/or 116). Further, it should be understood that the flow diagram in FIG. 3 is merely described in such manner for the sake of clarity and explanation and that some functions may be carried out in various other manners as well, including the possibility that example functions may be added, removed, rearranged into different orders, grouped together, and/or not grouped together at all.

According to the present disclosure, the example workflow for creating an action item related to a collaborative task may begin with an assignor requesting access to a first front-end module of the disclosed software application via the assignor's client station, which may be one of client station 112, 114, or 116. In this respect, the first front-end module may be associated in some way with a collaborative task with which the assignor is involved (e.g., budget reconciliation), and the assignor may choose to request access to the first front-end module for various reasons. As possibilities, the assignor may request access to the first front-end module to review the status of the collaborative task with which the assignor is involved (which may in turn result in the assignor deciding that a new action item should be created), or the assignor may request access to the first front-end module for the specific purpose of creating a new action item related to the collaborative task, among other possible reasons.

In practice, the assignor may request this access by launching a native application on the assignor's client station or directing a web browser on the assignor's client station to a uniform resource locator (URL) for the disclosed software application, among other possibilities.

At block 302, in response to receiving the assignor's request, back-end platform 102 may cause the assignor's client station to present the first front-end module of the disclosed software application. For instance, client station 112 may send a request to back-end platform 102 to access the first front-end module of the disclosed software application, and back-end platform 102 may cause client station 112 to present the first front-end module of the disclosed software in response to such a request. The first front-end module that may be presented to the client station may take various forms.

Figure 4A:
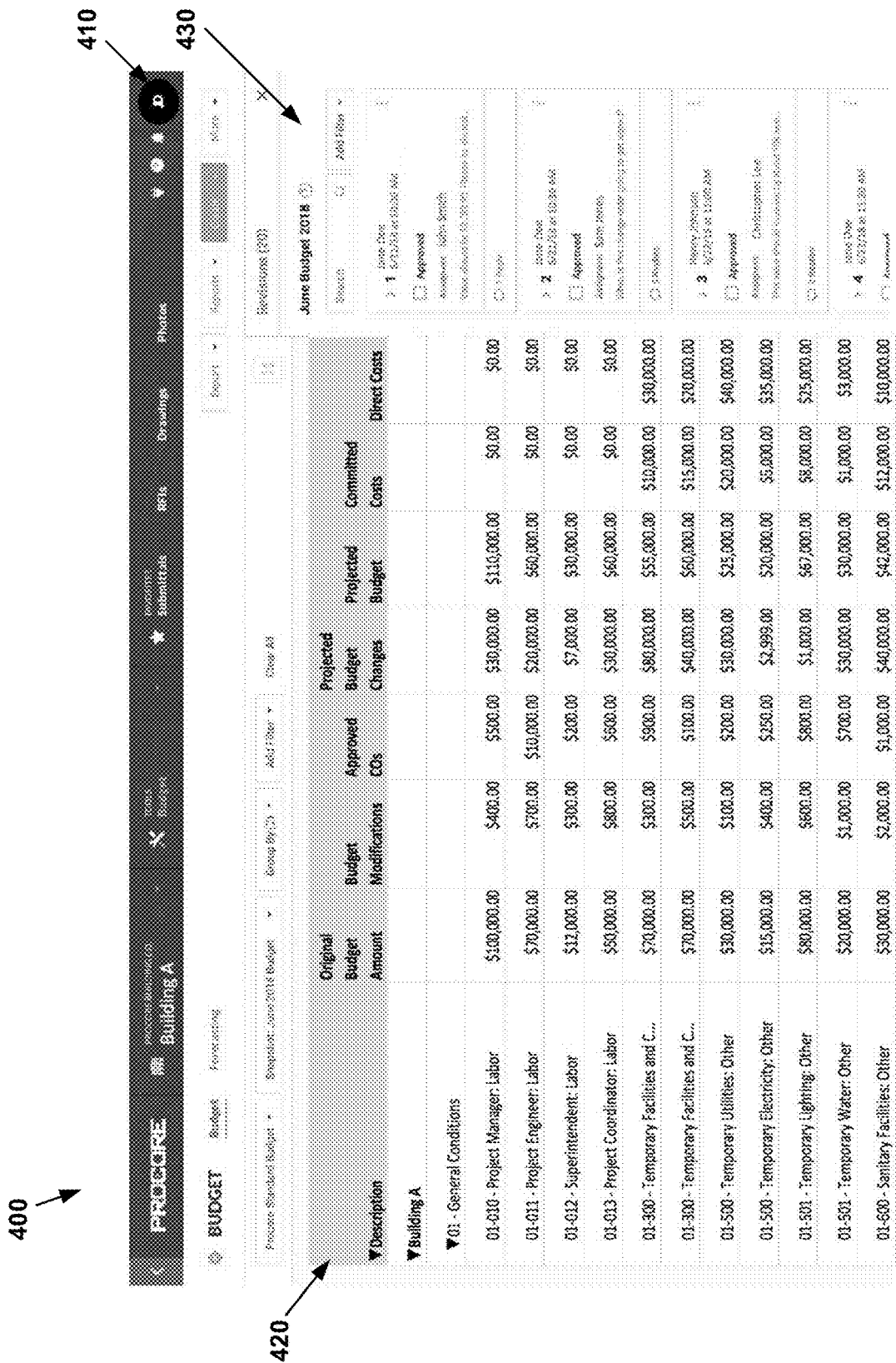
FIG. 4A depicts an example view of a front-end module that may be presented to a client station.

As one example to illustrate, FIG. 4A depicts an example view 400 that may be defined by the given front-end module of the disclosed software application. As shown, view 400 presents a "Budget" front-end module related to a budget reconciliation task for a construction project involving "Building A." One of ordinary skill in the art will appreciate that the assignor may also access a different view defined by the first front-end module or another front-end module to check the progress of any given task for any given project.

As further shown in FIG. 4A, view 400 may include various elements, such as menu 410, windows 420, 430, among other elements (e.g., tabs, filters, etc.) that are not numerically referenced. One of ordinary skill in the art will appreciate that view 400 may include additional elements not shown and/or more or less of the depicted control elements.

Menu 410 may take various forms. As one possibility, as shown in FIG. 4A, menu 410 may take the form of a menu bar that is displayed horizontally across the top of view 400. As another possibility, as further shown in FIG. 4A, menu 410 may include one or more pull-down menus that may be used to request access to another front-end module of the disclosed software application (e.g., a front-end software module related to a different type of collaborative task or a front-end software module related to a collaborative task for a different project), and/or one or more individual icons, such as a user account icon that may selected to view a given individual's user account settings for the disclosed software application. In line with the discussion above, menu 410 may take various other forms as well.

Windows 420, 430 may also take various forms. For instance, as shown in FIG. 4A, a snapshot of the "Budget" module that may be used by the assignor to check the progress of the budget reconciliation task is presented in windows 420, 430. In this particular example, window 420 may take the form of a rectangular area that is displayed on the left side of view 400, and may include various data entry regions (i.e., cells) corresponding to a given budget allocated for a given resource (e.g., "Project Manager: Labor") involving Building A in the month of June. Window 430 may take the form of a rectangular area that is displayed on the right side of view 400, and may include a list of completed and/or outstanding action items related to the budget reconciliation task that have been assigned by a particular assignor to one or more assignees in the month of June.

It should be understood that because the assignor may access a different view defined by the first front-end module or another front-end module to check the progress of any given task for any given project, windows 420, 430 may also take various other forms as well. For instance, depending on the type of task and/or the particular given front-end software module that is accessed, window 420 may present a blueprint, computer code, or the like that is related to the given task, and window 430 may include an indication of the completed and/or outstanding action items related to the given task, which may take the form of a list that includes the completed and/or outstanding action items. One of ordinary skill in the art will appreciate that windows 420, 430 may take various other forms as well.

Further, in line with the discussion above, it should be understood that windows 420, 430 can be manipulated by the assignor to take various other forms as well, by hiding (e.g., minimizing, closing) windows 420 and/or 430 from view 400, adjusting the size of windows 420 and/or 430 (e.g., by dragging the corners of windows 420 and/or 430), moving windows 420 and/or 430 to a different area of module 400, as some non-limiting examples.

In practice, while accessing the first front-end software module, the assignor may input an indication that the assignor wishes to create a new action item in connection with some aspect of the information presented via the first front-end software module. The assignor may input this indication in various manners. As one possibility, the assignor may select a given portion of the user-interface view defined by the first front-end software module, and this selection alone may serve as an indication that the assignor wishes to create a new action item in connection with the given portion of the user-interface view defined by the first front-end software module. As another possibility, the assignor's selection of the given portion of the user-interface view defined by the first front-end software module may result in the assignor being presented with a context menu (or the like) that includes various options that may be available for the given portion of the user-interface view, examples of which may include an option to modify the information displayed in the given portion of the user-interface view and/or an option to create an action item in connection with the given portion of the user-interface view defined by the first front-end software module, in which case the assignor may use the context menu to input the indication that the assignor wishes to create a new action item. The assignor may input an indication that the assignor wishes to create a new action item in some other way as well.

To illustrate with a specific example, while accessing view 400 defined by the example "Budgeting" front-end software module, the assignor may notice that the data entry in the data entry region corresponding to "Budget Modifications" for "Sanitary Facilities" in window 420 needs to be modified. In turn, the assignor may input an indication that the assignor wishes to create a new action item in connection with that data entry region (e.g., by selecting the data entry region).

At block 304, back-end platform 102 may then receive the indication that the assignor wishes to create the new action item in connection with some aspect of the information presented via first front-end software module. For instance, the assignor's client station may send an indication of the assignor's input via the first front-end software module to back-end platform 102, which may in turn trigger back-end platform 102 to take one or more actions based on the assignor's input.

In particular, at block 306, back-end platform 102 may cause the assignor's client station to present a modified view of the first front-end software module that enables the assignor to input data defining the new action item to be created. In general, the modified view of the first front-end module may include one or more elements (windows, indicators, etc.) that may be different than the elements that were presented in the view that was initially accessed by the assignor (e.g., view 400). The modified view may take various forms.

As one example, in response to the assignor's selection of the data entry region corresponding to "Budget Modifications" for "Sanitary Facilities" in window 420 of view 400, back-end platform 102 may cause the assignor's client station to present an indicator that provides an indication of the assignor's selection of the data entry region. As another example, in response to the assignor's selection of the data entry region corresponding to "Budget Modifications" for "Sanitary Facilities" in window 420, back-end platform 102 may cause the assignor's client station to present a window (e.g., a pop-up window) to create an action item that corresponds to the selected data entry region.

Figure 4B:
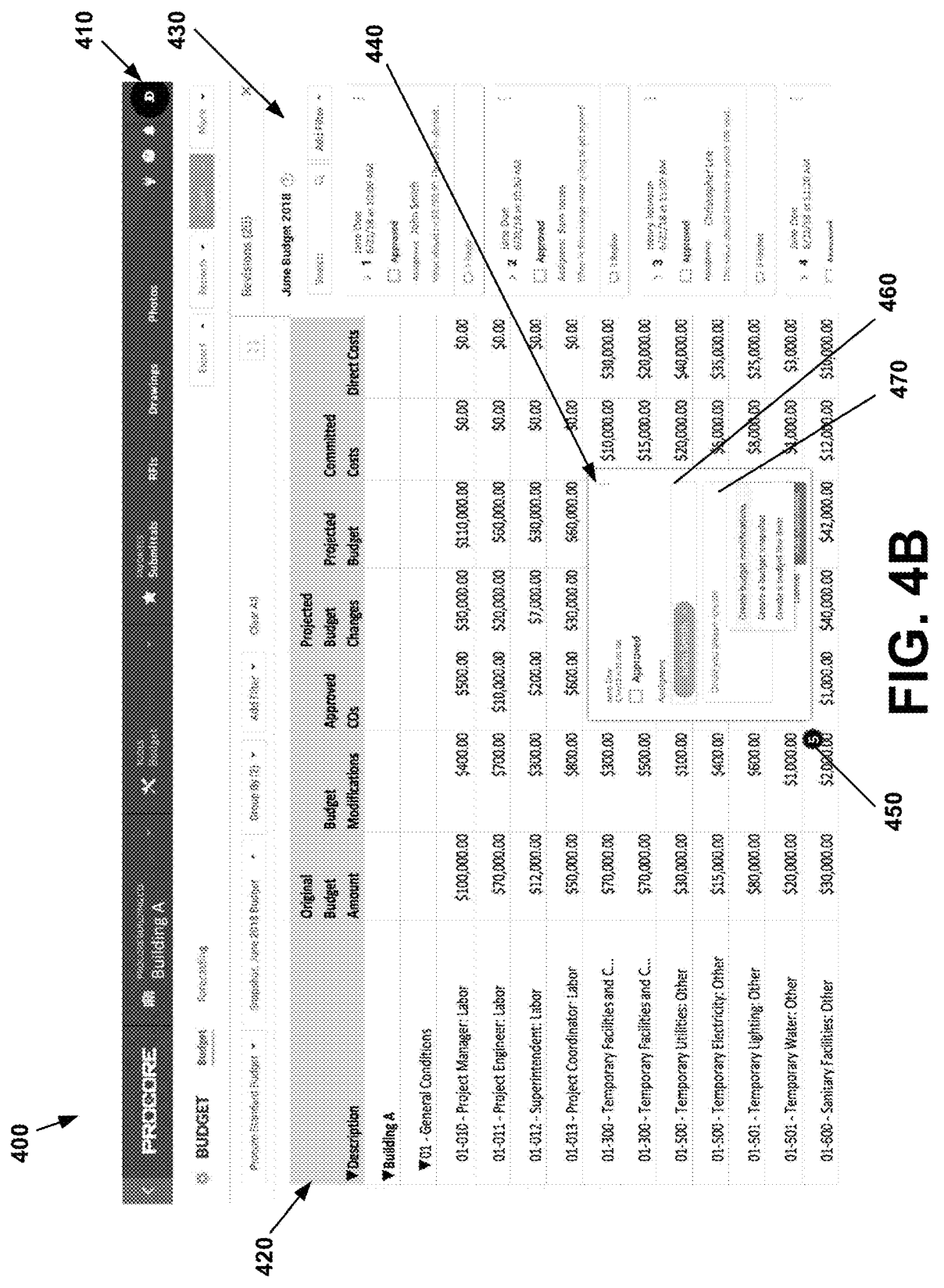

As one particular example to illustrate, FIG. 4B depicts a modified view 401 of view 400 that additionally includes a window 440 that may enable the assignor to create an action item for the selected data entry region, and an indicator 450 that indicates the selection of the data entry region. In line with the discussion above, window 440 and/or indicator 450 may be presented to the assignor's client station in response to the assignor's selection of the data entry region or alternatively, the assignor's selection of one or more specific options.

Further, in line with the discussion above, it should be understood that window 440 may take various other forms and can be presented in other areas of view 401. It should also be understood that indicator 450 may take various other forms as well and can be presented in other areas of view 401 relative to the selected data entry region.

While accessing the modified view of the given front-end module, the assignor may input data that defines the action item to be created. As some examples, the assignor may input data that identifies one or more assignees, a description of the particular action that needs to be taken by the one or more assignees that may include plain text and/or at least one action-embedded links to a second front-end software module that facilitates completion of the action item, and a an indication that the assignor has finished entering the data defining the action item, among other examples.

Figure 4C:
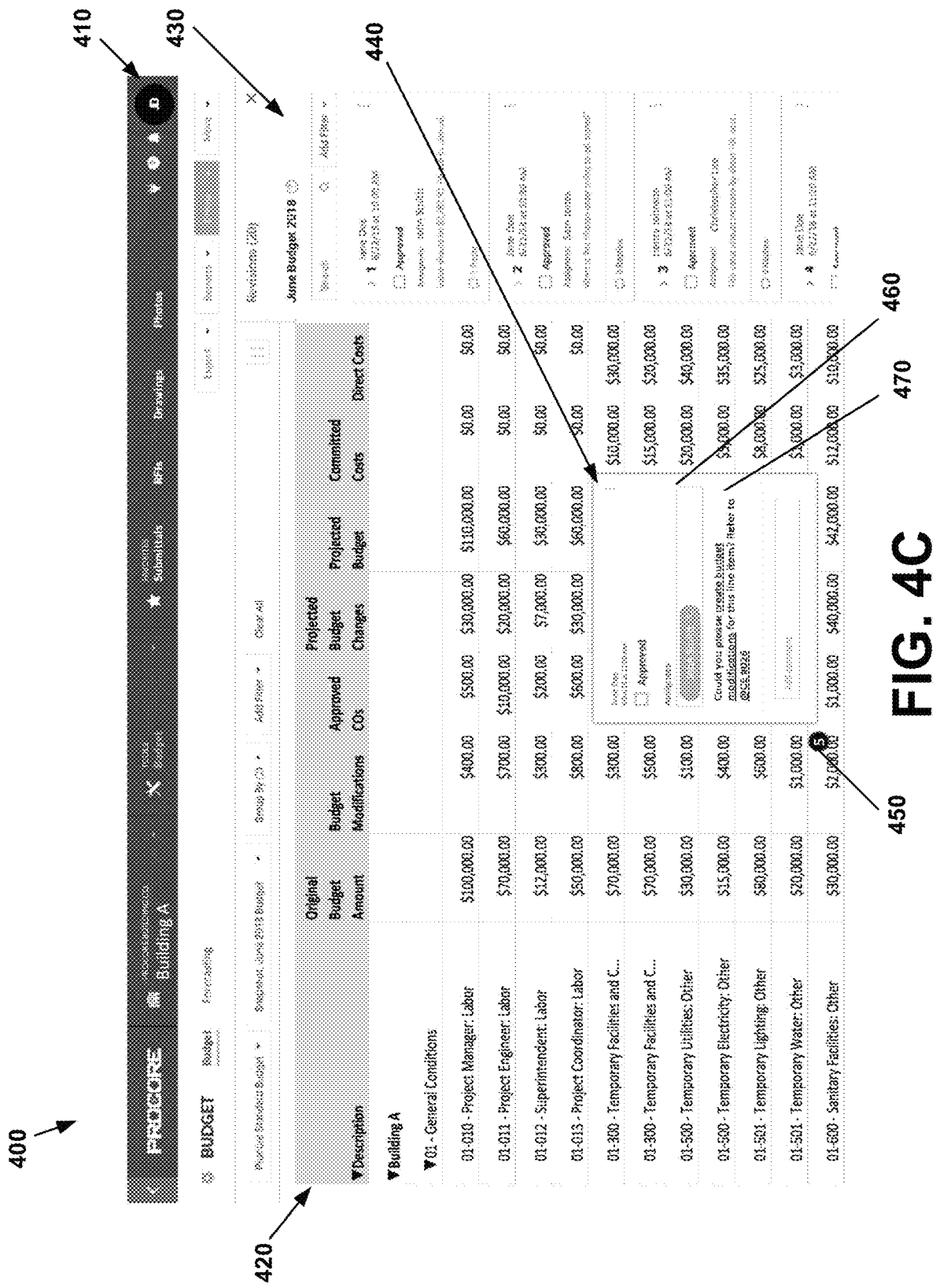
FIG. 4C depicts another example modified view of a front-end module that may be presented to a client station.

The assignor may input data that defines the action item to be created in various manners. As one example to illustrate, FIGS. 4B and 4C depict a snapshot of the information that defines the action item for creating budget modifications for the selected data entry region corresponding to "Budget Modifications" for "Sanitary Facilities," which may be defined in part by the assignor in window 440. In this particular example, after noticing that the data entry region corresponding to "Budget Modifications" for "Sanitary Facilities" needs to be modified, the assignor may wish to generate an action item to create budget modifications for the selected data entry region, which may involve accessing one particular front-end module of the disclosed software application to create the budget modifications for the selected data entry region and accessing another particular front-end module of the disclosed software application to create a new change event that documents the budget modifications created for the selected data entry region.

As shown, window 440 may include various data that the assignor may input to define the action item to create budget modifications for the selected data entry region. As one example, window 440 may include data that identifies one or more assignees (e.g., "John Smith") that the assignor may designate to complete the given action item. In practice, the assignor may identify a given assignee by populating an assignee input region (e.g., assignee input region 460) with data that identifies the given assignee. The assignee input region 460 may take various forms.

As one possibility, assignee input region 460 may take the form of a text entry box that allows the assignor to input data that identifies a given assignee. The assignor may input data in the text entry box in various manners. For instance, the assignor may input the name of a given assignee (e.g., "John Smith") by typing the name of the given assignee in assignee input region 460, which may cause back-end platform 102 to query a database (e.g., a database stored in data storage 204, or a database from an external data source) of users of the disclosed software application that match the name of the given assignee and then cause the client station to present the corresponding user in assignee input region 460. Alternatively, the assignor may input a particular symbol followed by one or more other characters that identifies the name of a given assignee in assignee input region 460 (e.g., "@John S"), which may cause back-end platform 102 to query a database of users of the disclosed software application that comprises the input following the particular symbol (e.g., "John S") and then cause the client station to present the corresponding user(s) in assignee input region 460. The assignor may input data in the text entry box in various other manners as well.

As another possibility, assignee input region 460 may take the form of a pull-down menu that allows the assignor to select one or more assignees. Assignee input region 460 may take various other forms as well.

As further shown in FIGS. 4B and 4C, window 440 may include various other data that the assignor may input to define the action item to create budget modifications for the selected data entry region. As another example, as shown in FIGS. 4B and 4C, window 440 may include action input region 470, which generally allows the assignor to describe the particular action that needs to be taken by a given assignee.

For instance, with respect to action input region 470 in FIG. 4C, the assignor (i.e., Jane Doe) may describe an action for a given assignee (i.e., John Smith) to create budget modifications for the selected data entry region that corresponds to "Budget Modifications" for "Sanitary Facilities." In the process of defining the action, the assignor may also include an action-embedded link (e.g., "create budget modifications", "@CE #026") to a second front-end software module that facilitates completion of the action item. For example, the action-embedded link, "create budget modifications," may be an embedded link to a second front-end module of the disclosed software application that facilitates the creation of budget modifications for the selected data entry region that corresponds to "Budget Modifications" for "Sanitary Facilities." As another example, the action-embedded link, @CE #026," may be an embedded link to a second front-end module of the disclosed software application (which may be different than the module that facilitates the creation of budget modifications) that facilitates the creation of a new change event that documents the budget modifications that were created for the selected data entry region. The assignor may include other action-embedded links in action input region 470 as well.

Action input region 470 may take various forms. As one possibility, action input region 470 may take the form of a text entry box that enables the assignor to input plain text characters to describe a given action, which may include an action-embedded link. In practice, the assignor may create an action-embedded link in various manners.

As one possibility, as shown in FIG. 4B, to create the action-embedded link, "create budget modifications," the assignor may input a particular symbol followed by one or more other characters that identifies the given action-embedded link (e.g., "/create") in the text entry box of action input region 470, which may trigger back-end platform 102 to query a database (e.g., a database stored in data storage 204, or a database from an external data source) and cause the assignor's client station to present one or more action-embedded links in action input region 470 that comprises the characters following the particular symbol (e.g., "Create budget modifications", "Create a budget snapshot", etc.). The assignor may then select the action-embedded link related to the action item being defined.

Similarly, as shown in FIG. 4C, to create the action-embedded link, "@CE #026", the assignor may input a particular symbol (e.g., "@") followed by one or more other characters that identifies the given action-embedded link in the text entry box of action input region 470, which may trigger back-end platform 102 to query a database (e.g., a database stored in data storage 204, or a database from an external data source) and cause the assignor's client station to present one or more action-embedded links in action input region 470 that comprises the characters following the particular symbol. The assignor may then select the action-embedded link related to the action item being defined. The assignor may create an action-embedded link in various other manners as well.

It should be understood that action input region 470 may take various other forms. Further, it should be understood that the assignor's client station and/or back-end platform 102 may alternatively generate the data that can be input by the assignor to define the action item to be created. For instance, in response to the assignor's selection of the data entry region corresponding to "Budget Modifications" for "Sanitary Facilities" (or alternatively, the assignor's selection of one or more specific options to create an action item for the selected data entry region), back-end platform 102 may utilize machine learning or other techniques known in the art to cause the assignor's client station to present window 440 and in particular, present the action-embedded link, "create budget modifications," in action input region 470 without the need for the assignor to input characters to create the action-embedded link.

In addition to the user input defining the action item to be created, the assignor's client station and/or back-end platform 102 may also contribute to the data that defines the action item. For example, back-end platform 102 may cause the assignor's client station to present data that identifies the assignor creating the action item, the creation date of the action item, and/or a status indicator for the action item to be created that may later enable the assignor to approve the action item upon completion, among other examples.

As one particular example to illustrate, as shown in FIGS. 4B and 4C, in response to the assignor's selection of the data entry region corresponding to "Budget Modifications" for "Sanitary Facilities" (or alternatively, the assignor's selection of an option to create an action item for the selected data entry region), back-end platform 102 may cause the assignor's client station to present, in window 440, the name of the assignor (i.e., "Jane Doe) and the creation date of the action item for creating budget modifications corresponding to the selected data entry region. Additionally, back-end platform 102 may cause the assignor's client station to present, in window 440, a status indicator for the action item that may later enable the assignor to approve the action item upon completion.

It should be understood that the data that identifies the assignor, the creation date of the action item, and/or the status indicator for the action item may take various forms. For instance, as shown in FIGS. 4B and 4C, the status indicator in window 440 may take the form of a check box that may later enable the assignor to indicate that the action item has been approved and/or completed. The status indicator may take various other forms as well, examples of which may include a text entry box, and/or a pull-down menu.

It should also be understood that the assignor may alternatively input data that identifies the assignor, the creation date of the action item, and/or indicates the status of the action item. For instance, window 440 may include an assignor data field and/or a creation date data field that enables the assignor to populate the assignor's name and creation date of the action item in the respective data fields (e.g., by inputting text characters, selecting the assignor's name and/or creation date from a pull-down menu, etc.).

At block 308, back-end platform 102 may then receive the data that defines the action item. For instance, the assignor's client station may send the information to back-end platform 102, which may in turn trigger back-end platform 102 to take one or more actions based on the received information. As one example, back-end platform 102 may store the information that defines the action item and/or a portion of view 401 that is related to the action item (e.g., the selected data entry region related to the action item for creating budget modifications). As another example back-end platform 102 may generate an alert to notify a given assignee that has designated by the assignor to complete the action item. Back-end platform 102 may take other actions as well.

After the action item has been created, the disclosed software application may provide an assignee of the action item with a workflow for reviewing and potentially taking steps to complete the action item. Some example functions that may be carried out in order to provide such a workflow will now be described with reference to FIG. 5.

For the purposes of illustration only, the example functions are described as being carried out by a back-end platform (e.g., back-end platform 102) that has access to data related to action items for one or more collaborative tasks (i.e., task-related data). However, it is possible that the responsibility for carrying out the functions of the disclosed process could be distributed between a back-end platform (e.g., back-end platform 102) and one or more client stations (e.g., client stations 112, 114, and/or 116). Further, it should be further understood that the flow diagram in FIG. 5 is merely described in such manner for the sake of clarity and explanation and that some functions may be carried out in various other manners as well, including the possibility that example functions may be added, removed, rearranged into different orders, grouped together, and/or not grouped together at all.

In accordance with the present disclosure, the example workflow for reviewing and taking steps to complete an action item may begin with an assignee requesting access to a first front-end software module of the disclosed software application that includes an indication of one or more actions items assigned to the assignee via the assignee's client station, which may be one of client station 112, 114, or 116. In this respect, the first front-end module may be the same front-end software module that was used by an assignor to create the one or more action items or may be a different front-end software module of the disclosed software application.

In practice, the assignee may request access to the first front-end module to check if the assignee has been assigned an action item and potentially complete the action item. The assignee may request this access by launching a native application on the assignee's client station or directing a web browser on the assignee's client station to a uniform resource locator (URL) for the disclosed software application, among other possibilities. One of ordinary skill in the art will appreciate that an assignee may access the first front-end module for various other purposes as well.

At block 502, in response to receiving the assignee's request, back-end platform 102 may cause the assignee's client station to present the first front-end software module of the disclosed software application that includes the indication of the one or more action items. For instance, client station 114 may send a request to back-end platform 102 to access the first front-end module, and back-end platform 102 may cause client station 114 to present the first front-end module in response to such a request. The first front-end module that may be presented to the assignee's client station may take various forms.

To illustrate, one example view of the first front-end module that may be presented via the assignee's client station may take the form of example view 400 in FIG. 4A, which includes a list of action items in window 430 that indicate one or more action items assigned to the assignee. One of ordinary skill in the art will appreciate that the indication of the one or more action items is not limited to a list and may take various other forms as well.

In practice, while accessing the first front-end module that indicates one or more action items assigned to the assignee, the assignee may input a request to view an action item in more detail. In one practical example, while accessing the view, the assignee may check if the assignee has been assigned an action item for a budget reconciliation task. For instance, with respect to FIG. 4A, which includes view 400 that may be similar to the view of the first front-end module, the assignee (e.g., "John Smith") may check a list of action items in a window similar to window 430 to see if the assignee has been assigned a particular action item. While checking the window, the assignee may notice the action item created by the assignor ("Jane Doe") as described above. At this point, the assignee may input a request to view the action item in more detail (e.g., by selecting the action item from the window).

At block 504, back-end platform 102 may then receive the assignee's input indicating a selection of the action item from the first front-end module. For instance, the assignee's client station may send the assignee's input to back-end platform 102, which may in turn trigger back-end platform 102 to take one or more actions based on the assignee's input.

In particular, at block 506, back-end platform 102 may cause the assignee's client station to present a modified view of the first front-end module that presents the selected action item to the assignee. In line with the discussion above, the modified view of the first front-end module may include one or more elements (windows, indicators, etc.) that may be different than the elements that were presented in the view of the first module that was initially accessed by the assignee. The modified view may take various forms.

As one particular example to illustrate, the modified view may take the form similar to view 401 shown in FIG. 4C. For instance, the modified view in this example may include a window similar to window 440 that includes the data defining the action item, including the particular action to create budget modifications for the data entry region corresponding to "Budget Modifications" for "Sanitary Facilities," along with the action-embedded links "create budge modifications" and "@CE #026." The modified view in this example may also include an indicator similar to indicator 450 that indicates that the action item to create budget modifications is for the data entry region corresponding to "Budget Modifications" for "Sanitary Facilities." The modified view may take various other forms as well.

While accessing the modified view of the given front-end module, the assignee may take various steps to complete the action item.

As one possibility, the assignee may select a given action-embedded link that is included in the action item, which may be presented in the modified view. For instance, to create budget modifications for the data entry region corresponding to "Budget Modifications" for "Sanitary Facilities," the assignee may select the "create budget modifications" action-embedded link from a description box similar to action input region 470. The assignee may take various other steps to complete the action item as well.

At block 508, back-end platform 102 may then receive input indicating the selection of the action-embedded link included in the action item. For instance, the assignee's client station may send an indication of the assignee's selection of the action-embedded link to back-end platform 102, which may in turn trigger back-end platform 102 to take one or more actions.

In particular, in response to the received input indicating the selection of the action-embedded link, at block 510, back-end platform 102 may cause the assignee's client station to present a second front-end software module of the disclosed software application identified by the selected action-embedded link that facilitates completion of the action item and also potentially cause data related to the action item to be pre-populated within the second front-end software module. Depending on the action-embedded link selected by assignee, the second front-end module may take various forms.

Figure 6:
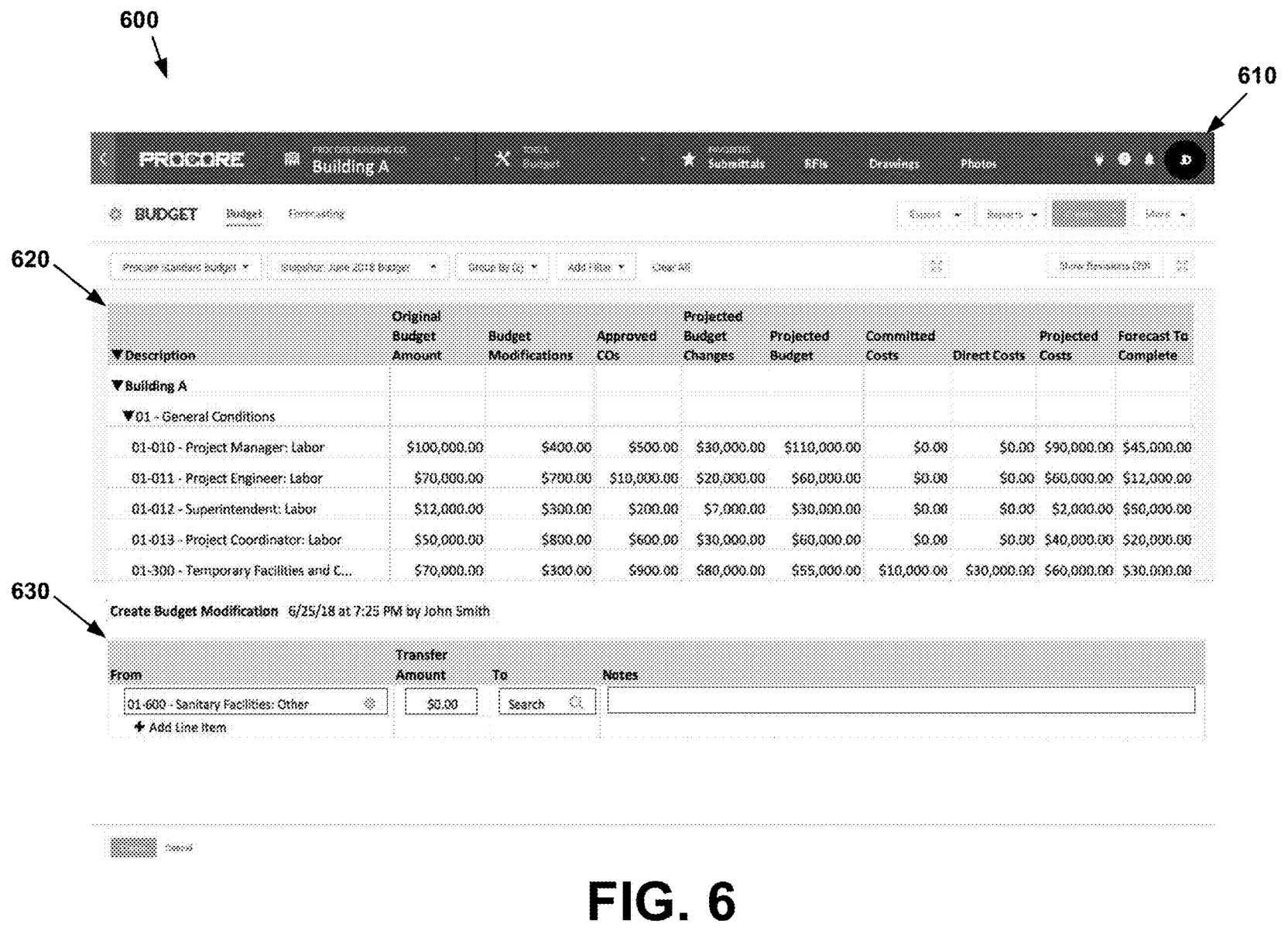

As one example to illustrate, FIG. 6 depicts an example module 600 that may be presented to the assignee via the assignee's client station as a result of the assignee's selection of the "create budget modifications" action-embedded link described in the example above. As shown, module 600 may include various elements, such as menu 610, windows 620, 630, among other elements that are not numerically referenced. In line with the discussion above, these elements may take various forms.

Specifically, window 630 may include various data and/or data entry fields that may be pre-populated or require the assignee to modify or populate to create the required budget modifications for the action item. As one example, window 630 may include data that identifies the selected action-embedded link (e.g., "Create Budget Modifications"), which may be pre-populated based on the assignee's selection of the action-embedded link "create budget modifications." As another example, window 630 may include data that identifies the specific line item for which the budget modifications are being created (i.e., the data entry corresponding to "Budget Modifications" for "Sanitary Facilities"), which may also be pre-populated based on the assignee's selection of the action-embedded link "create budge modifications." As yet another example, window 630 may include data that specifies the budget amount ("$0.00") for the specific line item, which may need to be modified by the assignee as part of creating the budget modifications. Window 630 may include various other data and/or data entry fields that may be pre-populated or require the assignee to modify or populate as well.

Figure 7:
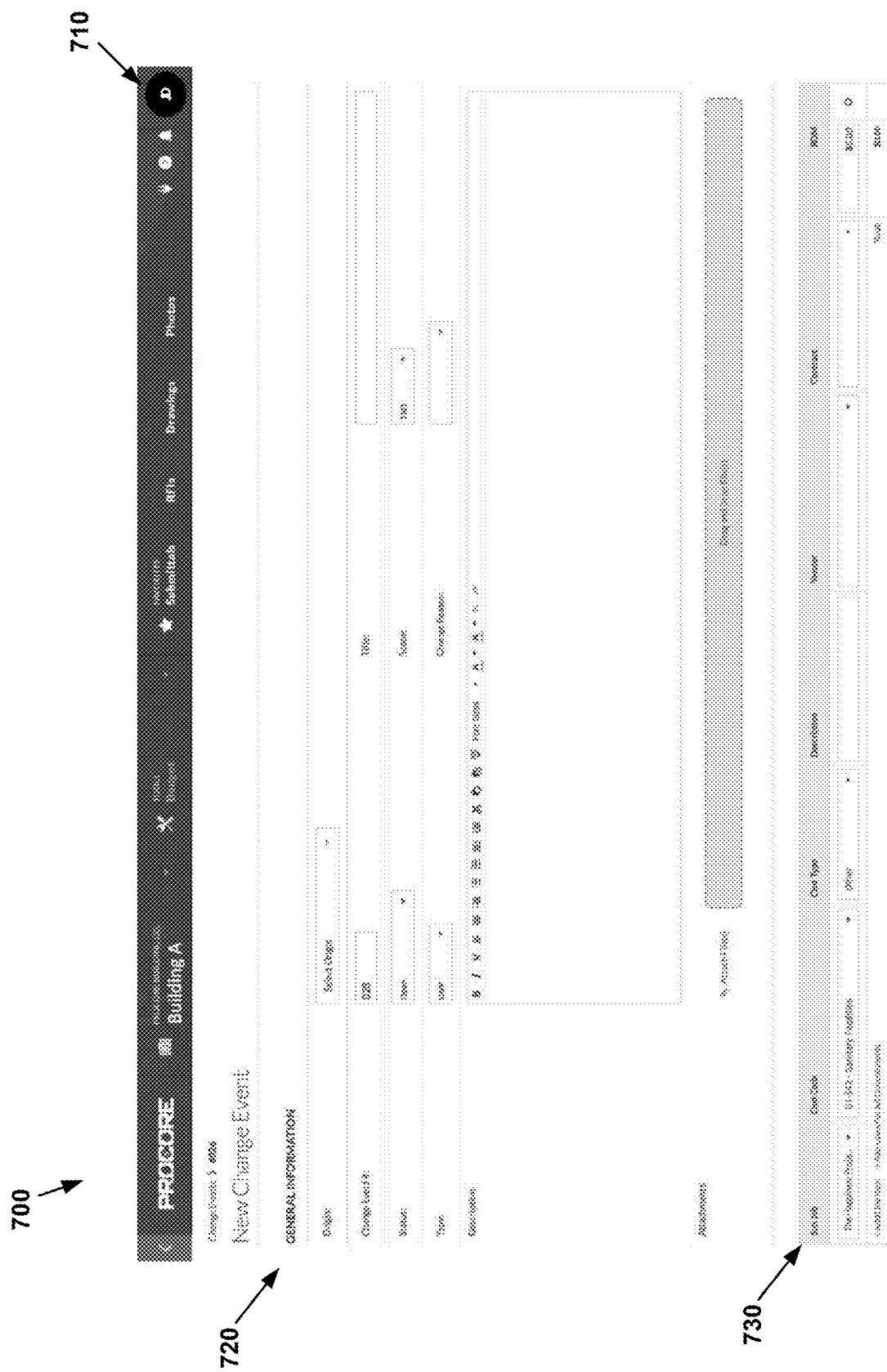
FIG. 7 depicts yet another example view of a front-end module that may be presented to a client station.

As another example to illustrate, FIG. 7 depicts an example module 700 that may be presented to the assignee's client station based on the assignee's selection of the action-embedded link, "@CE #026," described in the examples above. As shown, module 700 may include various elements, such as menu 710, windows 720, 730, among other elements that are not numerically referenced. In line with the discussion above, these elements may take various forms.

Specifically, windows 720, 730 may include various data and/or data fields that may be pre-populated or require the assignee to modify or populate to create a new change event (e.g., Change Event "#026") that documents the budget modifications that are to be created by the assignee using module 600. As one example, window 720 may include data that identifies the selected action-embedded link (e.g., the "Change Event #026"), which may be pre-populated based on the assignee's selection of the action-embedded link "@CE #026." As another example, window 720 may include a "Description" field that may require the assignee to populate to describe the budget modifications that are to be created for the data entry corresponding to "Budget Modifications" for "Sanitary Facilities." Windows 720, 730 may include various other data and/or data entry fields that may be pre-populated or require the assignee to modify or populate as well.

At block 512, back-end platform 102 may then receive data indicating that the action item has been completed. For instance, after the assignee populates one or more data fields in window 630 of module 600 to create budget modifications for the action item and/or in windows 720, 730 of module 700 to create a new change event to document the budget modifications that were created, the assignee's client station may send an indication that the action item has been completed to back-end platform 102, which may in turn trigger back-end platform 102 to update data defining the action item to indicate that the action item has been completed.

At block 514, back-end platform 102 may then cause one or both of the assignor's client station or the assignee's client station to present an indication that the action item has been completed. For example, back-end platform 102 may update data defining the action item to indicate that the action item has been completed and cause one or both of the assignor's client station or the assignee's client station to present an updated view of the first front-end software module that includes an indication that the action item has been completed. The updated view of the first front-end module may take various forms.

As one representative example to illustrate, FIG. 8 depicts an example view 800, which may include menu 810, windows 820, 830, action item entry 840, and indicator 850, among other elements that are not numerically referenced. In line with the discussion above, these elements may take various forms.

In one particular example, window 830 may take the form of a list that includes one or more action items, including the action item to create budget modifications that was assigned to the assignee, which may be presented in action item entry 840. As shown, action item entry 840 may include an indication that the action item to create budget modifications that was assigned by the assignor (i.e., Jane Doe) has been completed by the assignee (i.e., John Smith) on Jun. 24, 2018. Action item entry 840 may include various other information as well, such as the information used to define the action item for creating budget modifications. Additionally, view 800 may include indicator 850, which may take the form similar to indicator 450 in FIG. 4A, to indicate that the action item to create budget modifications has been completed with respect to the data entry region corresponding to "Budget Modifications" for "Sanitary Facilities." The elements shown in view 800 may take various other forms as well.

Further, depending on the project, task for a given project, and/or action item related to a given task, the updated view may take various other forms as well.

IV. CONCLUSION

Example embodiments of the disclosed innovations have been described above. Those skilled in the art will understand, however, that changes and modifications may be made to the embodiments described without departing from the true scope and spirit of the present invention, which will be defined by claims.

Further, to the extent that examples described herein involve operations performed or initiated by actors, such as "humans," "operators," "users" or other entities, this is for purposes of example and explanation only. Claims should not be construed as requiring action by such actors unless explicitly recited in claim language.

The invention claimed is:

1. A computing system comprising:
a network interface;
at least one processor;
at least one non-transitory computer-readable medium; and
program instructions stored on the at least one non-transitory computer-readable medium that are executable by the at least one processor to cause the computing system to perform functions including:
causing a first client station associated with a first user to begin running a first front-end software module of a given application that facilitates interaction between users related to a collaborative task, wherein the first front-end software module provides a first graphical user interface (GUI) that enables the first user to input a request to assign an action item related to the collaborative task to a second user by (i) selecting a data entity related to the collaborative task that is displayed within the first GUI, (ii) inputting an identification of the second user, (iii) inputting a textual description of the action item comprising one or more characters that cause the first GUI to display a set of respective candidate links to one or more other front-end software modules of the given application that may be embedded into the action item, wherein each other front-end software module of the given application facilitates creation of a respective type of data entity, and (iv) selecting, from the displayed set of respective candidate links, a link to a second front-end software module of the given application that is to be embedded into the action item and can be used to create at least one new data entity to facilitate completion of the action item;
receiving, via the first front-end software module of the given application running on the first client station associated with the first user, data defining the first user's request to assign the action item related to the collaborative task to the second user, wherein the action item comprises (i) the identification of the second user, (ii) the textual description of the action item including an embedded link to the second front-end software module of the given application that can be used to create the at least one new data entity to facilitate completion of the action item, and (iii) embedded data that is to be pre-populated into the second front-end software module of the given application when the embedded link to the second front-end software module is selected, wherein the embedded data includes one or more of: data about the action item, data about the selected data entity, data about the first user, data about the second user, or data about the embedded link to the second front-end software module;

after receiving the data defining the first user's request to assign the action item to the second user, causing a second client station associated with the second user to present the action item to the second user;

receiving, via the second client station, an indication that the second user has selected the embedded link to the second front-end software module of the given application;

in response to receiving the indication that the second user has selected the embedded link to the second front-end software module of the given application:
causing the second client station to begin running the second front-end software module of the given application, wherein the second front-end software module of the given application provides a second GUI that enables the second user to input data defining the at least one new data entity to facilitate completion of the action item; and
causing the embedded data to be pre-populated into one or more fields of the second GUI provided by the second front-end software module of the given application that is running on the second client station for creation of the at least one new data entity;

receiving, via the second front-end software module of the given application running on the second client station, the data defining the at least one new data entity;

after receiving the data defining the at least one new data entity, determining that the action item has been completed; and causing one or both of the first client station or the second client station to present an indication that the action item has been completed.

2. The computing system of claim 1, wherein the embedded data comprises data about the selected data entity that is displayed within the first GUI provided by the first front-end software module.

3. The computing system of claim 2, wherein the first GUI comprises a spreadsheet view and the selected data entity comprises a given data-entry region within the spreadsheet view.

4. The computing system of claim 1, wherein the program instructions stored on the at least one non-transitory computer-readable medium that are executable by the at least one processor to cause the computing system to perform functions including causing the second client station to present the action item to the second user comprise program instructions that are executable by the at least one processor to cause the computing system to perform functions including:
causing the second client station to begin running the first front-end software module of the given application and to present the action item to the second user via the first front-end software module.

5. The computing system of claim 4, wherein the selected data entity has a given position within the first GUI provided by the first front-end software module, and wherein the program instructions stored on the at least one non-transitory computer-readable medium that are executable by the at least one processor to cause the computing system to perform functions including causing the second client station to present the action item to the second user via the first front-end software module of the given application comprise program instructions that are executable by the at least one processor to cause the computing system to perform functions including:
causing the second client station to present the action item to the second user at a position within the first GUI provided by the first front-end software module that is at or near the given position of the selected data entity within the first GUI provided by the first front-end software module.

6. The computing system of claim 5, wherein the first GUI comprises a spreadsheet view and the selected data entity comprises a given data-entry region within the spreadsheet view.

7. The computing system of claim 1, wherein the one or more characters that cause the first GUI to display the set of respective candidate links to the one or more other front-end software modules of the given application that may be embedded into the action item comprise a given symbol followed by one or more text characters that describe a type of link to be embedded.

8. A method performed by a computing system, the method comprising:
causing a first client station associated with a first user to begin running a first front-end software module of a given application that facilitates interaction between users related to a collaborative task, wherein the first front-end software module provides a first graphical user interface (GUI) that enables the first user to input a request to assign an action item related to the collaborative task to a second user by (i) selecting a data entity related to the collaborative task that is displayed within the first GUI, (ii) inputting an identification of the second user, (iii) inputting a textual description of the action item comprising one or more characters that cause the first GUI to display a set of respective candidate links to one or more other front-end software modules of the given application that may be embedded into the action item, wherein each other front-end software modules of the given application facilitates creation of a respective type of data entity, and (iv) selecting, from the displayed set of respective candidate links, a link to a second front-end software module of the given application that can be used to create at least one new data entity to facilitate completion of the action item;

receiving, via the first front-end software module of the given application running on the first client station associated with the first user, data defining the first user's request to assign the action item related to the collaborative task to the second user, wherein the action item comprises (i) the identification of the second user, (ii) the textual description of the action item including an embedded link to the second front-end software module of the given application that can be used to create the at least one new data entity to facilitate completion of the action item, and (iii) embedded data that is to be pre-populated into the second front-end software module of the given application when the embedded link to the second front-end software module is selected, wherein the embedded data includes one or more of: data about the action item, data about the selected data entity, data about the first user, data about the second user, or data about the embedded link to the second front-end software module;

after receiving the data defining the first user's request to assign the action item to the second user, causing a second client station associated with the second user to present the action item to the second user;

receiving, via the second client station, an indication that the second user has selected the embedded link to the second front-end software module of the given application;

in response to receiving the indication that the second user has selected the embedded link to the second front-end software module of the given application:

causing the second client station to begin running the second front-end software module of the given application, wherein the second front-end software module of the given application provides a second GUI that enables the second user to input data defining the at least one new data entity to facilitate completion of the action item; and causing the embedded data to be pre-populated into one or more fields of the second GUI provided by the second front-end software module of the given application that is running on the second client station for creation of the at least one new data entity;

receiving, via the second front-end software module of the given application running on the second client station, the data defining the at least one new data entity;

after receiving the data defining the at least one new data entity, determining that the action item has been completed; and causing one or both of the first client station or the second client station to present an indication that the action item has been completed.

9. The method of claim 8, wherein the embedded data comprises data about the selected data entity that is displayed within the first GUI provided by the first front-end software module.

10. The method of claim 9, wherein the first GUI comprises a spreadsheet view and the selected data entity comprises a given data-entry region within the spreadsheet view.

11. The method of claim 8, wherein causing the second client station to present the action item to the second user comprises causing the second client station to begin running the first front-end software module and to present the action item to the second user via the first front-end software module.

12. The method of claim 11, wherein the selected data entity has a given position within the first GUI provided by the first front-end software module, and wherein causing the second client station to present the action item to the second user via the first front-end software module comprises causing the second client station to present the action item to the second user at a position within the first GUI provided by the first front-end software module that is at or near the given position of the selected data entity within the first GUI provided by the first front-end software module.

13. The method of claim 8, wherein the one or more characters that cause the first GUI to display the set of respective candidate links to the one or more other front-end software modules of the given application that may be embedded into the action item comprise a given symbol followed by one or more text characters that describe a type of link to be embedded.

14. A non-transitory computer-readable storage medium, wherein the non-transitory computer-readable storage medium is provisioned with program instructions that are executable by at least one processor to cause a computing system to:

cause a first client station associated with a first user to begin running a first front-end software module of a given application that facilitates interaction between users related to a collaborative task, wherein the first front-end software module provides a first graphical user interface (GUI) that enables the first user to input a request to assign an action item related to the collaborative task to a second user by (i) selecting a data entity related to the collaborative task that is displayed within the first GUI, (ii) inputting an identification of the second user, (iii) inputting a textual description of the action item comprising one or more characters that cause the first GUI to display a set of respective candidate links to one or more other front-end software modules of the given application that may be embedded into the action item, wherein each other front-end software modules of the given application facilitates creation of a respective type of data entity, and (iv) selecting, from the displayed set of respective candidate links, a link to a second front-end software module of the given application that can be used to create at least one new data entity to facilitate completion of the action item;

receive, via the first front-end software module of the given application running on the first client station associated with the first user, data defining the first user's request to assign the action item related to the collaborative task to the second user, wherein the action item comprises (i) the identification of the second user, (ii) the textual description of the action item including an embedded link to the second front-end software module of the given application that can be used to create the at least one new data entity to facilitate completion of the action item, and (iii) embedded data that is to be pre-populated into the second front-end software module of the given application when the embedded link to the second front-end software module is selected, wherein the embedded data includes one or more of: data about the action item, data about the selected data entity, data about the first user, data about the second user, or data about the embedded link to the second front-end software module;

after receiving the data defining the first user's request to assign the action item to the second user, cause a second client station associated with the second user to present the action item to the second user;

receive, via the second client station, an indication that the second user has selected the embedded link to the second front-end software module of the given application;

in response to receiving the indication that the second user has selected the embedded link to the second front-end software module of the given application:

cause the second client station to begin running the second front-end software module of the given application, wherein the second front-end software module provides a second GUI that enables the second user to input data defining the at least one new data entity to facilitate completion of the action item; and cause the embedded data to be pre-populated into the second front-end software module that is running on the second client station of the given application;

receive, via the second front-end software module of the given application running on the second client station, data defining the at least one new data entity;

after receiving the data defining the at least one new data entity, determine that the action item has been completed; and cause one or both of the first client station or the second client station to present an indication that the action item has been completed.

15. The non-transitory computer-readable storage medium of claim 14, wherein the embedded data comprises data about the selected data entity that is displayed within the first GUI provided by the first front-end software module.

16. The non-transitory computer-readable storage medium of claim 15, wherein the first GUI comprises a spreadsheet view and the selected data entity comprises a given data-entry region within the spreadsheet view.

17. The non-transitory computer-readable storage medium of claim 14, wherein the one or more characters that cause the first GUI to display the set of respective candidate links to one or more other front-end software modules that may be embedded into the action item comprise a given symbol followed by one or more text characters that describe a type of link to be embedded.

18. The computing system of claim 1, wherein the embedded data that is pre-populated into one or more fields of the second GUI provided by the second front-end software module comprises data about the embedded link and includes one or more of: data that identifies the embedded link selected by the second user, data describing the at least one new data entity that is being created, data indicating a given line item for which the at least one new data entity is being created, or data about a given cost associated with the at least one new data entity that is being created.

19. The computing system of claim 1, wherein the at least one new data entity comprises a first new data entity and a second new data entity, and wherein the action item further comprises an embedded link to a third front-end software module of the given application that can be used to create the second new data entity to facilitate completion of the action item, the computing system further comprising program instructions stored on the non-transitory computer-readable medium that are executable by the at least one processor to cause the computing system to perform functions including:

before determining that the action item has been completed, receiving, via the third front-end software module of the given application, data defining the second new data entity.

20. The method of claim 8, wherein the embedded data that is pre-populated into one or more fields of the second GUI provided by the second front-end software module comprises data about the embedded link and includes one or more of: data that identifies the embedded link selected by the second user, data describing the at least one new data entity that is being created, data indicating a given line item for which the at least one new data entity is being created, or data about a given cost associated with the at least one new data entity that is being created.

* * * * *